United States Patent
Duricic et al.

(10) Patent No.: US 11,342,824 B2
(45) Date of Patent: May 24, 2022

(54) METHOD FOR PRODUCING A ROTOR FOR AN ELECTRICAL MACHINE, IN PARTICULAR OF A MOTOR VEHICLE, AND ROTOR AND MOTOR VEHICLE

(71) Applicant: Bayerische Motoren Werke Aktiengesellschaft, Munich (DE)

(72) Inventors: Dragoljub Duricic, Munich (DE); Thorsten Rienecker, Munich (DE); Philipp Schlag, Munich (DE); Daniel Winkle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 243 days.

(21) Appl. No.: 16/727,388

(22) Filed: Dec. 26, 2019

(65) Prior Publication Data
US 2020/0136483 A1 Apr. 30, 2020

Related U.S. Application Data

(63) Continuation of application No. PCT/EP2018/066927, filed on Jun. 25, 2018.

(30) Foreign Application Priority Data

Jun. 27, 2017 (DE) ...................... 10 2017 210 742.1

(51) Int. Cl.
*H02K 15/12* (2006.01)
*H02K 1/22* (2006.01)
(Continued)

(52) U.S. Cl.
CPC ............... *H02K 15/12* (2013.01); *B60K 6/26* (2013.01); *H02K 1/22* (2013.01); *H02K 15/02* (2013.01)

(58) Field of Classification Search
CPC .......... H02K 1/22; H02K 15/02; H02K 15/12; B60K 6/26
See application file for complete search history.

(56) References Cited

U.S. PATENT DOCUMENTS

| 3,300,666 A | 1/1967 | Frazier et al. |
| 5,627,423 A | 5/1997 | Marioni |
(Continued)

FOREIGN PATENT DOCUMENTS

| CN | 101567605 A | 10/2009 |
| CN | 103872825 A | 6/2014 |
(Continued)

OTHER PUBLICATIONS

International Search Report (PCT/ISA/210) issued in PCT Application No. PCT/EP2018/066927 dated Aug. 29, 2018 with English translation (four (4) pages).
(Continued)

*Primary Examiner* — Burton S Mullins
(74) *Attorney, Agent, or Firm* — Crowell & Moring LLP

(57) ABSTRACT

A method produces a rotor having at least one laminated core for an electrical machine, in which method at least one partial region of the rotor is provided with a plastic by injection molding. The method provides at least one disk following the laminated core in the axial direction of the rotor, by which disk the partial region is at least to a large extent delimited in the axial direction of the rotor; and by the injection molding, injects the plastic into the partial region via at least one through-opening in the disk leading into the partial region.

10 Claims, 2 Drawing Sheets

(51) Int. Cl.
*H02K 15/02* (2006.01)
*B60K 6/26* (2007.10)

(56) References Cited

U.S. PATENT DOCUMENTS

| | | |
|---|---|---|
| 6,485,339 B1 | 11/2002 | Hartig et al. |
| 2009/0126184 A1 | 5/2009 | Smith et al. |
| 2014/0167531 A1 | 6/2014 | Hangmann |
| 2015/0108870 A1* | 4/2015 | Bulatow .............. H02K 7/04 |
| | | 310/216.117 |

FOREIGN PATENT DOCUMENTS

| | | |
|---|---|---|
| CN | 104137395 A | 11/2014 |
| DE | 102 19 190 A1 | 11/2003 |
| DE | 10 2006 044 767 A1 | 4/2008 |
| DE | 10 2007 060 011 A1 | 7/2009 |
| DE | 10 2012 205 760 A1 | 10/2013 |
| DE | 102012205760 * 10/2013 ............ H02K 15/02 |
| EP | 0 459 355 A1 | 12/1991 |
| EP | 0 633 648 A1 | 1/1995 |
| WO | WO 99/05023 A1 | 2/1999 |
| WO | WO 2008/034773 A1 | 3/2008 |

OTHER PUBLICATIONS

German-language Written Opinion (PCT/ISA/237) issued in PCT Application No. PCT/EP2018/066927 dated Aug. 29, 2018 (five (5) pages).

German-language Search Report issued in counterpart German Application No. 10 2017 210 742.1 dated Apr. 16, 2018 with partial English translation (13 pages).

Chinese-language Office Action issued in Chinese Application No. 201880042868.4 dated Sep. 9, 2021 with English translation (13 pages).

* cited by examiner

METHOD FOR PRODUCING A ROTOR FOR AN ELECTRICAL MACHINE, IN PARTICULAR OF A MOTOR VEHICLE, AND ROTOR AND MOTOR VEHICLE

CROSS REFERENCE TO RELATED APPLICATIONS

This application is a continuation of PCT International Application No. PCT/EP2018/066927, filed Jun. 25, 2018, which claims priority under 35 U.S.C. § 119 from German Patent Application No. 10 2017 210 742.1, filed Jun. 27, 2017, the entire disclosures of which are herein expressly incorporated by reference.

BACKGROUND AND SUMMARY OF THE INVENTION

The invention relates to a method for producing a rotor for an electrical machine, in particular of a motor vehicle. Furthermore, the invention relates to a rotor for an electrical machine, in particular of a motor vehicle. The invention also relates to a motor vehicle.

DE 10 2007 060 011 A1, for example, discloses a rotor for an electrical machine, and a method for producing such a rotor. The rotor has at least one laminated core. In the method, at least one partial region of the rotor is provided with a plastic by injection molding. In other words, the rotor has at least one partial region in which the rotor is provided with a plastic by injection molding.

In addition, DE 102 19 190 A1 discloses a permanent magnet rotor for an electrical machine. Furthermore, WO 99/05023 A1 discloses an electric motor.

It is the object of the present invention to provide a method and a rotor, and also a motor vehicle, of the type mentioned at the beginning such that the rotor can be provided with the plastic in a particularly simple manner.

A first aspect of the invention relates to a method for producing a rotor having at least one laminated core for an electrical machine, in particular of a motor vehicle. In the method, at least one partial region of the rotor is provided with a plastic by injection molding. For example, the plastic is injected, in particular in liquid form, into the partial region and thereby introduced into the partial region, and therefore at least the partial region is injection molded or insert molded with the plastic.

In order now to be able to provide the partial region with the plastic in a particularly advantageous and cost-effective manner, it is provided according to the invention that the method comprises a first step in which at least one disk following the laminated core in the axial direction of the rotor is provided. The disk is, for example, an end disk or a supporting disk which follows the laminated core in the axial direction or is arranged downstream or upstream of the laminated core in the axial direction. The partial region is at least predominantly delimited in the axial direction of the rotor by means of the disk, in particular by means of an end surface of the disk. This should be understood as meaning in particular that more than half of the partial region is covered in the axial direction, in particular on a corresponding end side of the partial region, by the disk and is thereby delimited. The disk preferably delimits the partial region directly, and therefore, for example, the plastic, if the latter is introduced or injected into the partial region, comes into contact with the disk and therefore directly touches the disk.

In a second step of the method preferably following the first step in time, by means of the injection molding the plastic is injected into the partial region via at least one through opening in the disk leading into the partial region. The plastic is injected, for example, through the through opening from a first side of the disk facing away from the partial region in the axial direction of the rotor and, in the process, is injected into the partial region such that the plastic thereby comes to a second side of the disk facing away from the first side in the axial direction. Therefore, for example, the second side of the disk faces the partial region in the axial direction of the rotor while the previously mentioned first side of the disk faces away from the partial region in the axial direction of the rotor. In particular, the partial region is at least predominantly delimited directly by the mentioned second side of the disk. The plastic is injected here, for example, from the outside via the through opening into the partial region. This should be understood as meaning in particular that the plastic is injected through the through opening from the first side and is thereby brought onto the second side and introduced into the partial region. Since the disk or the second side of the disk preferably directly delimits the partial region here, the disk is so to say back molded with the plastic, and therefore the plastic is sprayed, for example, against the second side. By this means, the partial region can be provided particularly simply and therefore in a time- and cost-favorable manner with the plastic.

The injecting or introducing of the plastic into the partial region is also referred to as insert molding or impregnating of the rotor. The impregnating of the rotor is used in order to provide the rotor with particularly high strength, and therefore particularly advantageous properties of the electrical machine designed, for example, as a current-excited synchronous machine, can be realized overall.

Conventionally, in order to impregnate the rotor, complicated and costly molds, in particular casting molds, and dies, in particular injection molding dies, are required in order to carry out the injection molding. Such complicated and costly molds and dies are required in particular since excessive leakages can conventionally occur if no countermeasures are taken. The plastic is conventionally introduced in a liquid state into the partial region, and therefore the plastic is highly fluid or has very low viscosity. Plastic can therefore undesirably escape from the partial region by way of corresponding leakages and can enter regions different from the partial region.

In order to avoid this, complicated and costly sealing measures are conventionally required, which leads to complicated and costly molds and dies. However, this can now be avoided by the method according to the invention. For this purpose, the rotor to be impregnated is configured in such a manner that possibly used molds and dies for carrying out the injection molding die merely provide contours. The disk is used here as a structural element which at least partially forms or delimits an outer contour of the partial region and permits filling of the partial region, and therefore of interior cavities of the rotor, with the plastic without excessive leakages occurring and without complicated and costly sealing measures or dies and molds being required.

The method according to the invention enables an injection molding die for carrying out the injection molding to be configured particularly simply and therefore cost-effectively, and therefore the rotor can be produced in a particularly cost-effective manner. Furthermore, a great diversity of variants can be incorporated with the same starting situation. In other words, it is, for example, possible by means of the method according to the invention to provide a plurality of differing constructional variants of the rotor with respective plastics by injection molding using the same injection molding die. Since, for example, the disk at least partially predetermines the outer contour of the partial region, time- and cost-intensive finishing operations can be kept particularly small, and therefore the rotor can be produced particularly cost-effectively.

The use of the disk makes it possible to provide an at least virtually completely closed contour which delimits the partial region, and therefore the injection molding die can be configured particularly simply and therefore cost-effectively. In addition, it is possible to be able to impregnate different types of rotor, that is to say the previously mentioned different constructional variants, using one and the same die. The at least virtually completely closed contour is realized here by the disk which, for example, can be adapted simply and cost-effectively in comparison to conventional rotors.

In order to be able to impregnate the rotor particularly simply and cost-effectively, it is provided, in an advantageous refinement of the invention, that at least one sealing element for sealing the partial region is arranged between the disk and the laminated core in the axial direction of the rotor. The sealing element is, for example, firstly supported, in particular directly, on the disk, wherein the sealing element, secondly, is supported, for example, in particular directly, on the laminated core. The disk is thereby sealed against the laminated core, for example by means of the sealing element, wherein, for example, at least a length region of the partial region is outwardly delimited in the radial direction by the sealing element. If the plastic is injected, for example, into the partial region, the plastic enters into contact, for example, with at least part of an inner circumferential lateral surface of the sealing element, wherein the sealing element prevents an excessive amount of the plastic from undesirably escaping from the rotor, in particular in the radial direction.

In order to be able to seal the partial region particularly advantageously here, it is provided, in a further refinement of the invention, that the sealing element is heated by means of heat which is output by the plastic when the plastic is injected into the partial region. In other words, the plastic is injected in a liquid state into the partial region. In order to bring about the liquid state of the plastic, the plastic is heated and thereby, for example, melted such that the plastic is injected in a liquid and heated state into the partial region. The plastic therefore contains heat and outputs at least some of this heat to the sealing element while the plastic is injected into the partial region. As a result, the sealing element is heated, and therefore the partial region can be particularly advantageously sealed. In addition, the rotor or at least the laminated core can be preheated depending on the plastic. For example, when a plastic is in the form of a thermoplastic, the rotor or at least the laminated core is preheated to circa 80 degrees Celsius and, when a plastic is in the form of a thermosetting plastic, is preheated to circa 150 degrees Celsius.

In order to realize particularly high tightness of the partial region, it is provided, in a further embodiment of the invention, that the sealing element is at least partially deformed by the heat.

A further embodiment is distinguished in that the sealing element is at least partially deformed, in particular pressed together, by means of the injection molding die used to carry out the injection molding. By deformation of the sealing element, the latter can be brought, for example, to locations, such as, in particular, into joins and/or gaps or the like, wherein leakages can conventionally occur at such locations. This can now be prevented, and therefore the partial region can be particularly readily sealed.

Within the scope of the injection molding, the plastic is injected, for example, into the partial region at a pressure which is greater than 500 bar. Since the pressure is very high and the plastic is highly fluid, sufficient sealing of the partial region is advantageous in order to be able to advantageously impregnate the rotor and, as a result, realize advantageous properties of the rotor. By impregnating the rotor, the latter can be configured with a particularly high strength, and therefore said rotor can withstand, for example, even high rotational speeds without damage. A plurality of joining points at which the plastic can escape from the rotor are conventionally provided. Said joining points conventionally have to be sealed in a complicated and cost-intensive manner, but this can now be avoided by the method according to the invention.

The plastic used is, for example, a thermosetting plastic, in particular an epoxy resin, as a result of which a particularly high strength of the rotor can be realized. In contrast to an elastomer, a thermosetting plastic which is completely crosslinked cannot be reactivated again, and therefore it is not possible, or possible only to a very limited extent, to be able to change and influence or process the plastic after the plastic has already been injected into the partial region and has already hardened. Therefore, even the injecting of the plastic into the partial region should take place in a precise and defined manner, which is now possible by means of the method according to the invention.

A plastic sealing element is preferably used as the sealing element, and therefore the sealing element is preferably formed from a plastic, in particular from an elastomer, from thermoplastic or from a silicone. Tolerances can be compensated for by means of the sealing element, and therefore, for example within the scope of mass or series manufacturing of rotors for electrical machines, said rotors, which may differ from one another in their external dimensions, for example because of tolerances, can be impregnated by injection molding in the described manner using one and the same injection molding die. The rotors can thereby be produced particularly simply and cost-effectively.

Furthermore, it is preferably provided that the plastic is injected into the partial region at a temperature which, for example, is 160 degrees Celsius or more. The sealing element here, for example, can be particularly advantageously heated and deformed as a result in order to be able to realize a particularly high degree of tightness of the partial region. Depending on the material, the plastic can be injected into the partial region even at a temperature of, for example, approximately 150 degrees Celsius.

In particular, it is preferably provided that over 75 percent of the partial region in the axial direction of the rotor is covered and therefore delimited by the disk, in particular by the mentioned end surface of the disk, as a result of which the rotor can be particularly advantageously impregnated. For example, the partial region can be covered and therefore delimited by over 90 percent in the axial direction of the rotor by the disk, in particular by the end surface of the disk.

Furthermore, at least one further die is preferably provided which at least partially surrounds the rotor on the outer circumference, in particular at least while the plastic is injected into the partial region. The further die is used, for example, in order to support and to temper, in particular to heat and/or to cool, the rotor.

A further embodiment is distinguished in that the plastic is injected into the partial region via a plurality of through openings in the disk leading into the partial region by means of the injection molding. By this means, for example, a particularly large amount of the plastic can be injected into the partial region in a short time, and therefore the method can be carried out particularly effectively in terms of time and therefore cost.

It is contemplated for the disk to be a die element which, after the plastic is injected into the partial region, is removed from the rotor and therefore does not belong to the rotor. However, it has been shown to be particularly advantageous if the disk is used as a constructional element of the fully produced rotor, as a result of which the method can be carried out particularly cost-effectively.

A second aspect of the invention relates to a rotor for an electrical machine, in particular a motor vehicle. The rotor has at least one laminated core and at least one partial region in which the rotor is provided with a plastic by injection molding.

In order now to be able to provide the rotor with the plastic particularly effectively in terms of time and cost, the rotor has at least one disk which follows the laminated core in the axial direction of the rotor, at least predominantly delimits the partial region in the axial direction of the rotor and has at least one through opening which leads into the partial region and via which the plastic is injected into the partial region by means of the injection molding. Advantages and advantageous refinements of the first aspect of the invention should be considered to be advantages and advantageous refinements of the second aspect of the invention, and vice versa.

The disk is formed, for example, from a material different from the plastic, wherein the material can be a second plastic or a metallic material. This means that the disk preferably has not been or is not formed from the plastic which is introduced into the partial region.

A third aspect of the invention relates to a motor vehicle, in particular a motor vehicle such as, for example, a passenger vehicle. The motor vehicle comprises at least one electrical machine which has at least one rotor according to the invention. Advantages and advantageous refinements of the first aspect and of the second aspect of the invention should be considered to be advantages and advantageous refinements of the third aspect of the invention, and vice versa.

The electrical machine is designed, for example, as a traction machine, by means of which at least one wheel of the motor vehicle or the motor vehicle as a whole can be electrically driven. For this purpose, the electrical machine can be operated, for example, in a motor mode and therefore as an electric motor.

Other objects, advantages and novel features of the present invention will become apparent from the following detailed description of one or more preferred embodiments when considered in conjunction with the accompanying drawings.

BRIEF DESCRIPTION OF THE DRAWINGS

Identical or functionally identical elements are provided with the same reference signs in the figures.

DETAILED DESCRIPTION OF THE DRAWINGS

Figure 1:
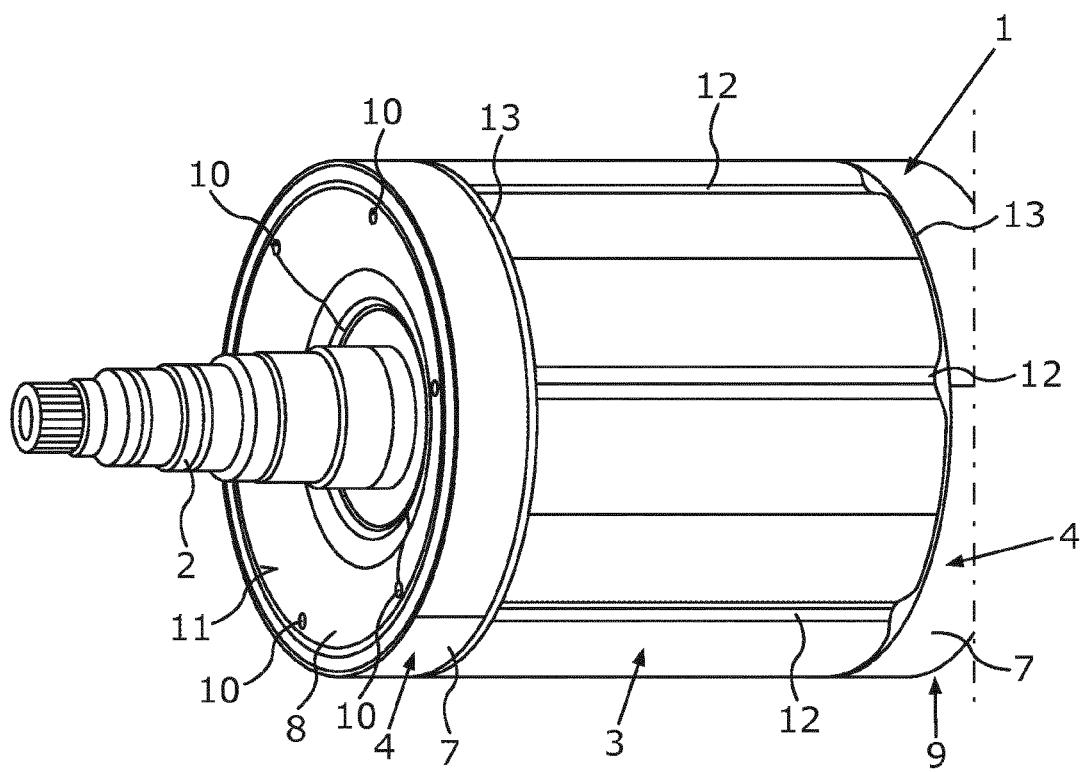
FIG. 1 is a schematic perspective view of an exemplary rotor which has been produced by a method according to an embodiment of the invention.
Figure 2:
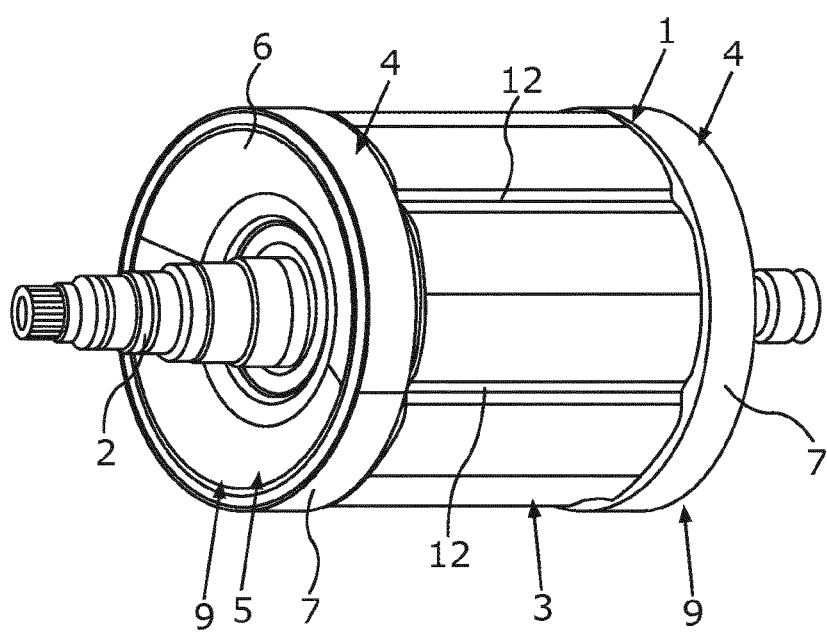
FIG. 2 is a further schematic perspective view of the rotor.

FIGS. 1 and 2 each show, in a schematic perspective view, part of a rotor 1 for an electrical machine, in particular of a motor vehicle. In addition, a method for producing the rotor 1 is described below with reference to the figures. The electrical machine is preferably a traction machine and is part of a drive train of the motor vehicle which can be driven by way of the drive train. The electrical machine is designed, for example, to electrically drive at least one wheel of the motor vehicle or the motor vehicle as a whole, and therefore the motor vehicle is in the form, for example, of a hybrid vehicle or electric vehicle. For this purpose, the electrical machine comprises, for example, a stator and a rotor 1 which is rotatable about an axis of rotation relative to the stator. In particular, the rotor 1 is drivable by the stator and is thereby rotatable about the axis of rotation relative to the stator.

The rotor 1 comprises a rotor shaft 2 via which the electrical machine, for example, can provide torques for driving the wheel or the motor vehicle. In order to drive the motor vehicle, the electrical machine is operated in a motor mode and therefore as an electric motor. For this purpose, the electrical machine is supplied, for example, with electrical energy or electric current, which electrical energy or electric current is stored in an energy store, such as, for example, a battery, in particular a high voltage battery. Furthermore, it is contemplated for the electrical machine to be operatable in a generator mode and therefore as a generator.

The rotor 1 furthermore comprises a laminated core 3 which is arranged on the rotor shaft 2 and is connected to the rotor shaft 2 for rotation therewith. In addition, the rotor 1 comprises respective disks 4 which adjoin the laminated core 3 on both sides in the axial direction of the rotor 1 and are designed, for example, as supporting disks or end disks. In other words, provision is made in the rotor 1 for the respective disk 4 to be arranged following the laminated core 3 in the axial direction of the rotor 1 or downstream or upstream of the laminated core 3—depending on the viewing direction.

In addition, the rotor 1 has a partial region 5 which can be seen, for example, from FIG. 2 and is provided with a plastic 6 by injection molding. It is therefore provided within the scope of the previously mentioned method that at least the partial region 5 of the rotor 1 is provided with the plastic 6 by injection molding. The injection molding is also referred to as an injection molding method and is carried out by use of a die in the form of an injection molding die, by which the plastic 6 is injected, and thereby introduced, at least into the partial region 5. The provision of the partial region 5 with the plastic 6 is also referred to as impregnating of the rotor 1, wherein the plastic 6 is preferably a thermosetting plastic. By means of this impregnating of the rotor 1, a particularly high strength of the rotor 1 can be realized.

In order now to be able to impregnate and, as a consequence, to produce the rotor 1 particularly simply and therefore cost-effectively, within the scope of the method the respective disk 4 is provided which follows the laminated core 3 in the axial direction of the rotor 1 and by which the partial region 5 is at least predominantly delimited directly in the axial direction of the rotor 1. For this purpose, the respective disk 4 has, for example, a ring 7 which is in the form in particular of a supporting ring, and a disk element 8 which is connected to the ring 7. For example, the disk element 8 is formed integrally with the ring 7. The partial region 5 is at least predominantly covered on a respective end side 9 in the axial direction of the rotor 1 by the respective disk 4, wherein the respective disk 4, in particular the respective disk element 8 or the inner side, covers and therefore delimits preferably over 90 percent of the partial region 5 in the axial direction.

The respective disk 4, in particular the respective disk element 8, has a plurality of through openings 10 which lead into the partial region 5. Within the scope of the method, the plastic 6 is injected, and thereby introduced, into the partial region 5 via the through openings 10 by the plastic 6 being injected through the through openings 10.

A first side 11 of the disk 4, in particular of the disk element 8, which side faces away from the partial region 5 in the axial direction of the rotor 1, can be seen in FIG. 1, wherein the plastic 6 is injected through the through opening 10, for example from the side 11 also referred to as the outer side, and is injected into the partial region 5. The respective disk 4, in particular the disk element 8, has a second side, in particular inner side, which faces away from the first side 11 in the axial direction and faces the partial region 5 or the plastic 6, wherein the partial region 5 is at least predominantly directly delimited in the axial direction by said inner side. Owing to the fact that the disk 4, in particular the disk element 8 and, in the process, the inner side, at least predominantly directly delimits the partial region 5, in particular by more than 90 percent, the plastic 6 comes into direct contact with the inner side and therefore the disk 4, and therefore the inner side or the disk 4 is so to say backmolded with the plastic 6.

Figure 3:
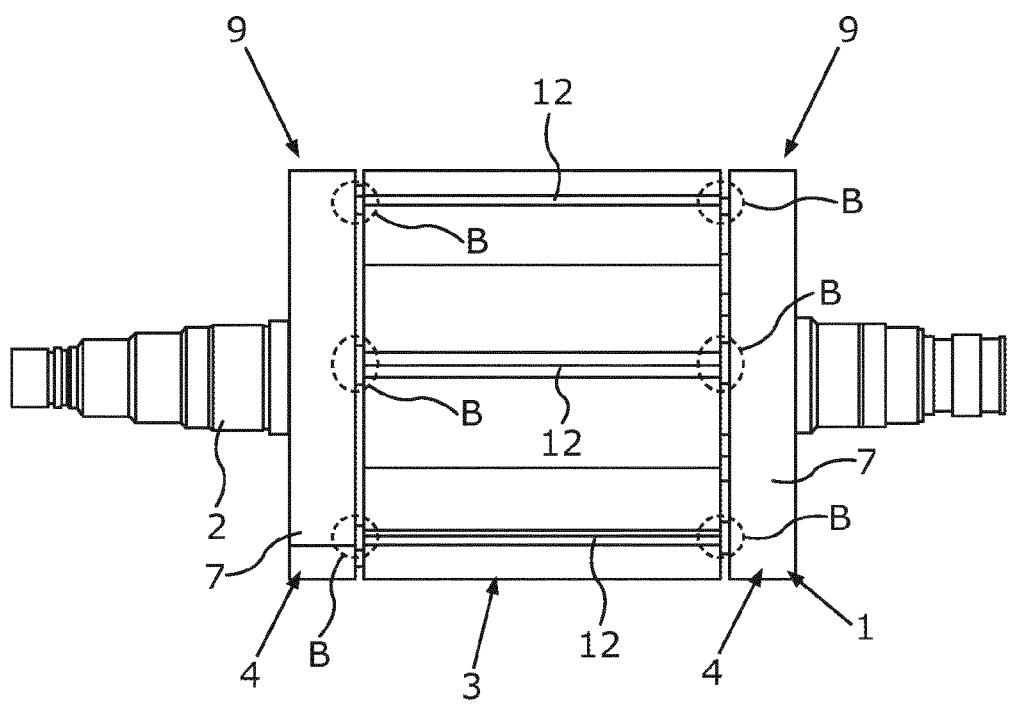
FIG. 3 shows a schematic side view of the rotor.

The use of the respective disk 4 makes it possible to avoid excessive leakages in a simple manner, and therefore complicated and cost-intensive sealing measures can be avoided. It has furthermore been found that leakages may conventionally occur in regions B shown in FIG. 3 since a plurality of components of the rotor 1 can be adjacent to one another, in particular can butt against one another, in the regions B. Said components are, for example, the respective disk 4, the laminated core 3 and respective covering elements 12, by means of which, for example, respective grooves of the laminated core 3 are covered and therefore closed.

In order here to be able to avoid an undesirable escape of the plastic 6 from the partial region 5 in the radial direction of the rotor 1, in particular while the plastic 6 is injected in a liquid and heated state into the partial region 5, a respective sealing element 13 is arranged between the laminated core 3 and the respective disk 4, preferably in the axial direction of the rotor 1, by means of which sealing element the partial region 5 is sealed, in particular outward in the radial direction of the rotor 1. In particular, the respective disk 4 is sealed against the laminated core 3 by means of the sealing element 13, and therefore, for example, the plastic 6 cannot flow through between the disk 4 and the laminated core 3 and therefore escape from the rotor 1 in the radial direction.

The plastic 6 is injected into the partial region 5, for example, at a temperature of at least 160 degrees, in particular of more than 160 degrees. In the process, for example, heat from the plastic 6 is transferred to the respective sealing element 13, thus heating the latter. As a result, the sealing element 13 can be particularly advantageously deformed, in particular pressed together, in particular by means of the injection molding die, and therefore in particular the regions B can be advantageously sealed. The use of the disks 4 and of the sealing elements 13 can create an at least virtually fully closed contour, by means of which the partial region 5 can be particularly advantageously delimited. Leakages can thereby be avoided in a cost-effective manner, and therefore the rotor 1 overall can be produced simply and cost-effectively. After the rotor 1 has been produced, the disks 4 remain on the rotor 1. This means that the disks 4 are structural elements or components of the finished or fully produced rotor 1, as a result of which the rotor 1 can be produced particularly simply and cost-effectively.

The respective sealing element 13 is preferably formed from a plastic, in particular from an elastomer, from a thermoplastic or from silicone. The plastic 6 can come into contact with the sealing element 13, in particular with an inner circumferential lateral surface of the sealing element 13 that faces the partial region 5, and therefore, for example, the sealing element 13 is at least partially injection molded or insert molded with the plastic 6. The plastic 6 is preferably injected in a particularly liquid state into the partial region 5, and therefore the plastic 6 can flow even into small or narrow construction spaces and gaps. An excessive escape of the liquid plastic from the rotor 1 can be avoided here by the disks 4 and the sealing elements 13.

LIST OF REFERENCE SIGNS

1 Rotor
2 Rotor shaft
3 Laminated core
4 Disk
5 Partial region
6 Plastic
7 Ring
8 Disk element
9 End side
10 Through opening
11 First side
12 Covering element
13 Sealing element
B Region The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a rotor having at least one laminated core for an electrical machine, in which method at least one partial region of the rotor is provided with a plastic by injection molding, the method comprising:
   providing at least one disk which follows the laminated core in an axial direction of the rotor and by which the partial region is at least predominantly delimited in the axial direction of the rotor; and
   by way of the injection molding, injecting the plastic into the partial region via at least one through opening in the disk leading into the partial region,
   wherein at least one sealing element for sealing the partial region is arranged between the disk and the laminated core in the axial direction of the rotor.

2. The method according to claim 1, wherein
   the sealing element is heated by heat which is output by the plastic when the plastic is injected into the partial region.

3. The method according to claim 2, wherein
   the sealing element is at least partially deformed by the heat.

4. The method according to claim 1, wherein
   the sealing element is at least partially deformed by an injection molding die used to carry out the injection molding.

5. The method according to claim 1, wherein
the sealing element is deformed by being pressed by the die.

6. The method according to claim 1, wherein
the plastic is injected into the partial region via a plurality of through openings in the disk leading into the partial region by the injection molding.

7. The method according to claim 1, wherein
the disk delimits over 75 percent of the partial region in the axial direction of the rotor.

8. The method according to claim 1, wherein
the disk forms a structural element of the rotor as produced.

9. A rotor for an electrical machine, comprising:
at least one laminated core;
at least one partial region in which the rotor is provided with a plastic by injection molding;
at least one disk which follows the laminated core in an axial direction of the rotor, at least predominantly delimits the partial region in the axial direction of the rotor and has at least one through opening which leads into the partial region and via which the plastic is injected into the partial region by the injection molding; and
at least one sealing element for sealing the partial region, wherein the sealing element is arranged between the disk and the laminated core in the axial direction of the rotor.

10. A motor vehicle comprising at least one electrical machine having a rotor according to claim 9.

* * * * *